(12) United States Patent
Gong

(10) Patent No.: US 10,464,751 B2
(45) Date of Patent: Nov. 5, 2019

(54) VERTICAL STORAGE AND DISTRIBUTION DEVICE AND DRUG DISPENSER

(71) Applicant: JIANGSU XUNJIE CABINET TECHNOLOGY CO., LTD., Jiangsu (CN)

(72) Inventor: Zhonglin Gong, Jiangsu (CN)

(73) Assignee: JIANGSU XUNJIE CABINET TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 15/573,124

(22) PCT Filed: Jun. 2, 2015

(86) PCT No.: PCT/CN2015/080551
§ 371 (c)(1),
(2) Date: Nov. 9, 2017

(87) PCT Pub. No.: WO2016/179862
PCT Pub. Date: Nov. 17, 2016

(65) Prior Publication Data
US 2018/0105362 A1    Apr. 19, 2018

(30) Foreign Application Priority Data

May 11, 2015 (CN) .......................... 2015 1 0235030

(51) Int. Cl.
*B65G 1/08* (2006.01)
*B65G 1/04* (2006.01)

(52) U.S. Cl.
CPC .............. *B65G 1/08* (2013.01); *B65G 1/0471* (2013.01); *B65G 2201/027* (2013.01)

(58) Field of Classification Search
CPC ........................... B65G 1/08; B65G 2201/027

(Continued)

(56) References Cited

U.S. PATENT DOCUMENTS 3,095,114 A * 6/1963 Tobias ...................... G07F 5/26
                                                        221/114
3,502,382 A * 3/1970 Rainey .................... A47F 1/082
                                                        312/42

(Continued)

FOREIGN PATENT DOCUMENTS

CN       102874535       1/2013
CN       103318590       9/2013

(Continued)

OTHER PUBLICATIONS

"International Search Report (Form PCT/ISA/210)", dated Feb. 17, 2016, with English translation thereof, pp. 1-4.

*Primary Examiner* — Rakesh Kumar
(74) *Attorney, Agent, or Firm* — JCIPRNET

(57) ABSTRACT

The invention discloses a vertical storage and distribution device. The vertical storage and distribution device comprises a vertical storage channel used for storing articles, wherein the vertical storage channel is provided with a vertical storage trough composed of at least two side plates; the articles can be sequentially stacked in the vertical storage trough from bottom to top; an outlet is formed in the bottom end of the vertical storage trough, and the articles which are sequentially stacked in the vertical storage trough can be sequentially distributed from the outlet from bottom to top. The technical scheme is different from other existing transversely-placed article distribution devices in that the vertical structure is adopted so that the gravity of the articles can be completely utilized, and the articles can be distributed without being pushed by a mechanism similar to a spiral spring driving trolley; furthermore, by adoption of the vertical structure, the space is saved to the maximum extent, the device is made small, the articles can be distributed rapidly, and the distribution speed is high.

1 Claim, 22 Drawing Sheets

(58) Field of Classification Search
USPC .......................................... 221/270; 312/42
See application file for complete search history.

(56) References Cited

U.S. PATENT DOCUMENTS

| | | | | |
|---|---|---|---|---|
| 4,423,828 A * | 1/1984 | Tanaka | ................ | G07F 11/10 221/129 |
| 4,542,834 A * | 9/1985 | Kurosawa | ............ | G07F 11/16 221/116 |
| 4,676,398 A * | 6/1987 | Kokubun | ............ | G07F 11/24 221/129 |
| 4,854,477 A * | 8/1989 | Kurosawa | ............ | G07F 11/10 221/1 |
| 5,251,784 A * | 10/1993 | Chacon Sevila | .... | B65G 59/062 221/220 |
| 5,295,592 A * | 3/1994 | Thorne | ................ | A47F 1/08 211/59.2 |
| 5,503,298 A * | 4/1996 | Herman | ............... | A47F 1/10 221/250 |
| 5,511,690 A * | 4/1996 | Calhoun | ............ | B65G 59/062 221/197 |
| 5,667,082 A * | 9/1997 | Hamilton | ............ | A47F 1/08 211/15 |
| 5,848,935 A * | 12/1998 | Noell | ................ | G07F 17/32 463/16 |
| 6,098,839 A * | 8/2000 | Hunnell | ............ | B65H 1/06 221/197 |
| 6,378,729 B1 * | 4/2002 | Kodama | ............ | B65G 47/1407 221/196 |
| 6,431,398 B1 * | 8/2002 | Cook | ................ | G07F 11/04 221/124 |
| 6,467,648 B1 * | 10/2002 | Nishiyama | ............ | G07F 11/06 221/289 |
| 6,758,370 B2 * | 7/2004 | Cooke | ................ | G07F 11/06 221/194 |
| 9,520,013 B2 * | 12/2016 | Erikawa | ............ | G07F 11/10 |
| 9,652,924 B2 * | 5/2017 | Yasaka | ............ | G07F 11/24 |
| 9,710,993 B2 * | 7/2017 | Makino | ............ | G07F 11/24 |
| 9,811,966 B2 * | 11/2017 | Liu | ................ | G07F 11/24 |
| 2018/0105362 A1 * | 4/2018 | Gong | ................ | B65G 1/08 |

FOREIGN PATENT DOCUMENTS

| | | | |
|---|---|---|---|
| CN | 103832761 | * | 4/2014 |
| CN | 103832761 | | 6/2014 |
| JP | 2002272815 | | 9/2002 |

* cited by examiner

VERTICAL STORAGE AND DISTRIBUTION DEVICE AND DRUG DISPENSER

CROSS-REFERENCE TO RELATED APPLICATION

This application is a 371 application of the international PCT application serial no. PCT/CN2015/080551, filed on Jun. 2, 2015, which claims the priority benefit of China application no. 201510235030.5, filed on May 11, 2015. The entirety of each of the abovementioned patent applications is hereby incorporated by reference herein and made a part of this specification.

BACKGROUND OF THE INVENTION

Technical Field

The invention belongs to the field of distribution of warehoused articles, and particularly relates to a vertical storage and distribution device provided with a vertical storage channel and a drug dispenser adopting vertical storage and distribution devices.

Description of Related Art

At present, in the field of warehousing and distribution of box-packed articles and particularly box-packed drugs, as is shown in FIG. 1, 1-1, partition plate, 1-2, box-packed article, 1-3, anti-inversion brush, 1-4, spiral spring driving trolley, 1-5, device for preventing the next box from following, and 1-6, counting device; only under the condition that the box-packed articles are arranged with the maximum side faces in contact, the quantity of box-packed drugs contained in a storage channel can be maximized, the quantity of distributed drugs can be large, and the distribution efficiency can be high. As is shown in FIG. 1, an article distribution device is placed on a warehouse support in a slope mode, and articles slide downwards by means of gravity so as to be discharged out of a warehouse; or a device similar to a spiral spring driving trolley is adopted to push the box-packed articles behind, and the articles slide towards an outlet of the storage channel under the effect of pushing force behind and are finally pushed out of the article distribution device. A plurality of article distribution devices are sequentially arranged on the warehouse support, hundreds or thousands of article distribution devices of the drawer-type structure can be placed on the warehouse support, the article distribution devices can contain different box-packed articles, and thus different articles can be controlled to be discharged out of the warehouse by controlling the article distribution devices through a terminal controller.

However, the existing drawer-type article distribution device has the defects that the articles cannot smoothly slide downwards from the outlet, and consequentially the discharging effect is severely affected; in addition, due to the fact that the box-packed articles can move after sliding by a medium or long distance, the articles have already been out of order when arriving the outlet of the storage channel, and the discharging effect is not ideal.

A drawer-type box-packed article distribution device is disclosed in the Chinese patent document CN102874535A, the device comprises a storage channel, the storage channel is provided with a base plate, and a first partition plate and a second partition plate are connected to the two sides of the base plate; the device further comprises an article inlet and an article outlet, the first partition plate and the second partition plate extent upwards to be connected with devices for preventing articles from following at the front end of the storage channel and close to the outlet, and a lower baffle used for preventing the articles from sliding downwards and a cam enabling one end of each box-packed article to be lifted firstly are arranged at the outlet.

The drawer-type box-packed article distribution device adopting the above technical scheme is simple in structure and convenient to operate, the base plate can carry the box-packed articles and make the articles slide downwards, certain other auxiliary devices can be arranged on the base plate so that a mechanism similar to the spiral spring driving trolley can push the articles along a fixed roller way behind the box-packed articles, and certain other improvements of the base plate can also be made so that the box-packed articles can also slide downward smoothly by means of gravity without being pushed by the mechanism similar to the spiral spring driving trolley; it can also be obviously seen from the drawings attached to the description of the patent document that the drawer-type box-packed article distribution device is transversely placed on the support flat or obliquely; although the scheme has various advantages, disadvantages of the scheme are also obvious when the technical scheme is actually implemented, too much space can be occupied when the device is placed transversely, the space for arranging other components matched with the device is limited, the drug storage capacity is still not ideal, space needs to be reserved for the drug storage channel, and the size is large.

Therefore, it is necessary to develop a novel article distribution device which is higher in drug storage capacity, small in size, capable of saving space to the maximum extent, and simple in structure.

BRIEF SUMMARY OF THE INVENTION

The invention aims to provide a vertical storage and distribution device which is scientific and simple in structure, convenient to operate, small in size, high in distribution speed and high in accuracy rate.

According to the technical scheme adopted by the invention for realizing the above aim, a vertical storage and distribution device comprises a vertical storage channel used for storing articles, wherein the vertical storage channel is provided with a vertical storage trough composed of at least two side plates; the articles can be sequentially stacked in the vertical storage trough from bottom to top; an outlet is formed in the bottom end of the vertical storage trough, and the articles which are sequentially stacked in the vertical storage trough can be sequentially distributed from the outlet from bottom to top.

The vertical storage and distribution device adopting the above technical scheme and structure is different from other existing transversely-placed storage and distribution devices in that the vertical structure is adopted, so that the gravity of articles is completely utilized, and the articles can be distributed without being pushed by the mechanism similar to the spiral spring driving trolley; in addition, the vertical storage and distribution device of the vertical structure comprises the vertical storage channel used for storing the articles, the vertical storage channel is provided with the vertical storage trough, the articles are sequentially stacked in the vertical storage trough from bottom to top, since the gravity of the articles are completely utilized, gaps between the peripheral wall of the vertical storage trough and the articles can be minimized, the space is saved to the maximum extent, and the device is made small; the outlet is formed in the bottom end of the vertical storage trough, and by arranging the outlet at the bottom end of the vertical storage trough, the gravity of the articles to be distributed is maximized so that the articles can be distributed rapidly, and the distribution speed is high.

The vertical storage and distribution device is simple in structure, convenient to operate and also convenient to mount, the machining technique of the vertical storage and distribution device is simplified, position adjustment through manpower is not needed, the labor intensity of workers is relieved, and efficiency is improved; since the articles are generally sequentially stacked in the vertical storage and distribution device based on the maximum lateral areas (for box-packed drugs), the maximum lateral faces of the articles also adhere to a conveying device or a bearing device firstly when the articles are distributed from the outlet, the drug falling heights are uniform, drugs fall from the low-fall position without being damaged and are smoothly discharged out of a warehouse from the outlet, and thus the articles are distributed.

In addition, the articles can be sequentially stacked in the vertical storage and distribution device from bottom to top, and as the article located on the uppermost position is not blocked by the mechanism similar to the spiral spring driving trolley at all, drugs can be added into the vertical storage trough more conveniently and rapidly.

According to the further improvement, a discharging mechanism is arranged on the vertical storage channel, and the discharging mechanism acts to enable the articles which are sequentially stacked in the vertical storage trough to be sequentially distributed from the outlet from bottom to top.

The discharging mechanism arranged on the vertical storage channel is used for discharging the articles so that the article which is stacked at the lowermost position in the storage trough can move towards the outlet rapidly so as to be distributed rapidly, and the distribution speed is high.

According to the further improvement, a discharging module which can contain at least one article is arranged at the lower end of the vertical storage trough, and the discharging module can move to be dislocated relative to the vertical storage trough; movable turning plates are arranged at the bottom of the discharging module.

By arranging the discharging module, the to-be-distributed article located in the discharging module can be distributed at a time, and the article distribution speed is increased; when the discharging module moves relative to the vertical storage trough, the article above is supported by the upper end of the discharging module and cannot fall down, so that the article located in the discharging module is distributed without being affected; the movable turning plates are arranged at the bottom of the discharging module, the movable turning plate act to enable the article located in the discharging module to be distributed and to fall rapidly and conveniently once the discharging module moves to be disclosed; when the discharging module returns to the original position, the movable turning plates also return to the original positions, the article stacked above can fall into the empty discharging module, the next round of article distribution can be conducted, and the process is performed repeatedly; by adoption of the vertical storage and distribution device of the structure, one or more articles can be distributed at a time, and thus the article distribution speed is increased remarkably.

According to the further improvement, the discharging mechanism comprises a motor, and the motor drives a crank to rotate so as to make a push plate reciprocate in a slideway; the push plate pushes the discharging module to move to be dislocated; the movable turning plates make contact with the discharging module when the articles are distributed, the discharging module can move stably and rapidly to be dislocated, the error rate is low, and the service life is long; the movable turning plates make contact with the discharging module when the articles are distributed, namely the movable turning plates are driven to act by dislocated movement of the discharging module so as to distribute the articles, all power is from the motor in the discharging mechanism when the articles are distributed, the structure is scientific and reasonable, all components act consistently, and the error rate is low.

According to the further improvement, each movable turning plate comprises a vertical plate and a horizontal plate, wherein the vertical plate is connected with the vertical storage channel through a hinge and can rotate around the hinge at a certain angle to make the horizontal plate incline, and the article located in the discharging module is separated from the horizontal plate to be distributed.

The vertical plates are connected with the vertical storage channel through the hinges, the specific connection points are located at the upper end of the discharging module, in this way, when the articles are distributed, the discharging module moves to be dislocated and pushes the movable turning plates to act, so that the vertical plates rotate around the hinges at a certain angle to make the horizontal plates incline, the horizontal plates used for supporting the article in the discharging module incline, and thus the article is not supported anymore and then separated from the horizontal plates to be distributed.

According to the further improvement, torsion springs are arranged on the hinges, and the discharging module is provided with a detection component; the torsion springs are used for making the movable turning plates return to the original positions rapidly so that the next article distribution cycle can be performed rapidly; the discharging module is provided with the detection component, and the detection component can detect whether an article exists in the discharging module so as to judge whether article distribution goes wrong or not and can also detect whether an article falls into the discharging module after the discharging module returns to the original position, and thus it is ensured that the next article distribution cycle is performed normally.

The invention further aims to provide a vertical storage and distribution type drug dispenser which can distribute drugs rapidly and is low in error rate.

According to the technical scheme adopted by the invention for achieving the above aim, a vertical storage and distribution type drug dispenser adopts the vertical storage and distribution devices mentioned above and further comprises a control system and a frame, wherein at least one drug storage trough unit is arranged in the frame, each drug storage trough unit is formed by combining a plurality of vertical storage and distribution devices, and a conveying device is located at the lower ends of the drug storage trough units.

The drug distribution speed of the drug dispenser of the structure is higher; the drug dispenser is provided with at least one drug storage trough unit, each drug storage trough unit is formed by combining a plurality of vertical storage and distribution devices, in this way, once a drug distribution instruction is sent out by the control system, various drugs can be discharged from the drug storage trough units, all drugs on a prescription can be distributed within several seconds and are conveyed out of the drug dispenser through the conveying device located at the lower ends of the drug storage trough units, the error rate is low, and the drugs can be distributed rapidly; in addition, the drug dispenser adopts the vertical storage and distribution devices, so that space is saved, the quantity of drugs contained by the drug dispenser is increased under the same space condition, and the drug distribution speed is high.

According to the further improvement, the conveying device comprises a sorting conveying part and a directional conveying part, drugs distributed out from the vertical storage and distribution devices in the drug storage trough units fall onto the sorting conveying part firstly and then are conveyed to the directional conveying part from the sorting conveying part, afterwards, the directional conveying part conveys the drugs into a designated area according to the instruction from the control system, and thus all the drugs on the prescription are distributed.

According to the further improvement, each drug storage trough unit is of a drawer-type structure, and a plurality of vertical storage and distribution devices are arranged on the two sides of the drug storage trough units of the drawer-type structure respectively.

The drug storage trough units of the drawer-type structure are convenient to maintain and detect, and drugs can be manually added rapidly; a plurality of vertical storage and distribution devices are arranged on the two sides of the drug storage trough units respectively, so that more types of drugs can be distributed, and the quantity of distributed drugs is increased.

According to the further improvement, the multiple vertical storage and distribution devices located in the frame are assembled and arranged in a honeycomb mesh shape on the cross section of the frame; by adoption of the honeycomb-mesh-shaped assembly and arrangement mode, more vertical storage and distribution devices can be contained in the frame, accordingly, more types of drugs can be distributed, and the quantity of distributed drugs is increased.

According to the further improvement, a manipulator drug feeding device is arranged at the upper end of the frame, the space not occupied by the manipulator drug feeding device is reasonably planned, and on the whole, the space occupied by the drug dispenser is reduced.

The discharging mechanism of the vertical storage and distribution device of the invention can also be of another structure, specifically, the discharging mechanism is arranged at the bottom end of the vertical storage trough and located on the vertical storage channel, the discharging mechanism is provided with a push plate, the push plate can move towards the outlet to make an article fall to be discharged, and the push plate has a certain width and is high in torsion resistance; since the push plate pushes articles at a high frequency and is high in torsion resistance, the service life of the push plate is prolonged correspondingly, the maintenance cost is low, and the efficiency is high.

As a further improvement of the above technical scheme, the discharging mechanism is further provided with a shifting fork, one end of the shifting fork is movably connected with the push plate, and the other end of the shifting fork is close to and located below the outlet to form a supporting point for a to-be-discharged article; two baffles transversely extent out from the discharging mechanism; the push plate is located between the two baffles.

One end of the shifting fork is movably connected with the push plate, the push plate is located between the two baffles, namely, when the push plate moves towards the outlet, the to-be-discharged article gets away from the baffles, the push plate drives the other end, serving as the supporting point, of the shifting fork to gets away from the supported article at the same time, in this way, the supporting point and the two baffles cannot achieve stable three-point supporting for the article anymore, at the moment, the to-be-discharged article is not supported anymore and is suspended, and accordingly the article is discharged under the effect of gravity.

As a further improvement of the above technical scheme, a shifting fork wheel is arranged at the end, movably connected with the push plate, of the shifting fork and located in a sliding groove of the push plate, and the shifting fork wheel can reciprocate in the sliding groove in the length direction; by adoption of the structure, the push plate and the shifting fork can be movably connected more stably, when the push plate pushes the to-be-discharged article to move towards the outlet, one end of the shifting fork moves outwards in the sliding groove of the push plate, and the other end of the shifting fork is made to move outwards accordingly and does not support the to-be-discharged article anymore (namely the article is discharged); when the push plate moves back in the direction away from the outlet, one end of the shifting fork slides inwards in the sliding groove of the push plate, and the other end of the shifting fork is made to move inwards accordingly so as to support the next to-be-discharged article.

As a further improvement of the above technical scheme, the shifting fork is connected with one baffle through a shifting fork rotating shaft, so that the shifting fork and the baffle are relatively fixed at the connection point, the other end, serving as the supporting point, of the shifting fork moves inwards and outwards with the connection point as the fulcrum, the moving position can be controlled, and moving is stable; the other end, serving as the supporting point, of the shifting fork can only move in the transverse plane.

As a further improvement of the above technical scheme, a notch is formed in the side, away from the push plate, of the outlet, and the other end of the shifting fork is located at the lower end of the notch.

By arranging the notch, when the push plate and the shifting fork push the to-be-discharged article located at the lowermost position in the vertical storage trough outwards, the space for the to-be-discharged article to move outwards is large enough, and accordingly the to-be-discharged article is not supported by the shifting fork and the baffles anymore and is discharged smoothly.

As a further improvement of the above technical scheme, the discharging mechanism is provided with a motor, and the push plate is driven by the motor; since the push plate is driven by the motor, the power is relatively stable, and high working efficiency and long service life can still be kept under the high operating frequency condition.

As a further improvement of the above technical scheme, one end of the push plate is connected with the motor and can transversely move inwards and backwards around the connection point; since one end of the push plate is connected with the motor, the push plate can give a response rapidly when driven by the motor, and 'inwards' and 'outwards' mentioned in the invention are with respect to the vertical storage trough.

As a further improvement of the above technical scheme, the discharging mechanism can move up and down along one side of the vertical storage trough.

The discharging mechanism moves up and down along one side of the vertical storage trough, in this way, when an article is added, the discharging mechanism moves upwards to be close to the upper end of the vertical storage trough, and the article is added into the vertical storage trough from an adding port in the upper end of the vertical storage trough; since the discharging mechanism is also close to the upper end of the vertical storage trough, the vertical falling distance of the article in the vertical storage trough is short, and articles can be stacked in order; meanwhile, every time one article or a certain quantity of articles are added, the discharging mechanism moves downwards by a certain distance, and the article adding speed is stable; furthermore, the discharging mechanism can move up and down along one side of the vertical storage trough, and thus the quantity of articles in the vertical storage trough can be worked out according to the moving distance.

As a further improvement of the above technical scheme, one side of the vertical storage trough is open, so that a mounting surface for the discharging mechanism is formed; grooves are formed in the two vertical edges of the mounting surface, the portions, connected with the vertical storage trough, of the discharging mechanism are embedded and mounted in the grooves, and thus the discharging mechanism can move up and down on the mounting surface of the vertical storage trough along the grooves.

One side of the vertical storage trough is open, so that a mounting surface for the discharging mechanism is formed; by adoption of the structure, the beneficial effect that the stacking state of articles in the vertical storage trough can be obtained through visual inspection is achieved, the discharging mechanism moves up and down on the mounting surface and is clamped in grooves, and thus operating is stable.

BRIEF DESCRIPTION OF THE DRAWINGS

A further detailed description is given with accompanying drawings and embodiments of the invention as follows.

Wherein, 1—vertical storage channel; 2—vertical storage trough; 201—mounting surface; 2011, 2012—vertical edges; 2013, 2014—grooves; 3—discharging mechanism; 301—motor; 302—push plate; 3021—sliding groove; 303—shifting fork; 3031—one end of the shifting fork; 3032—the other end of the shifting fork; 3033—shifting fork wheel; 3034—shifting fork rotating shaft; 3035—supporting point; 304, 305—baffles; 4—outlet; 401—notch; 5—discharging module; 6—movable turning plate; 601—vertical plate; 602—horizontal plate; 603—transverse push plate; 7—discharging mechanism; 701—motor; 702—crank; 703—push plate; 704—slideway; 8—hinge; 9—torsion spring; 10—vertical storage and distribution type drug dispenser; 1001—frame; 1002—drug storage trough unit; 1003—conveying device; 11—article/drug; 12—LED display; 13—handle; 14—basket elevator; 15—basket dispenser.

DETAILED DESCRIPTION OF THE INVENTION

Figure 1:
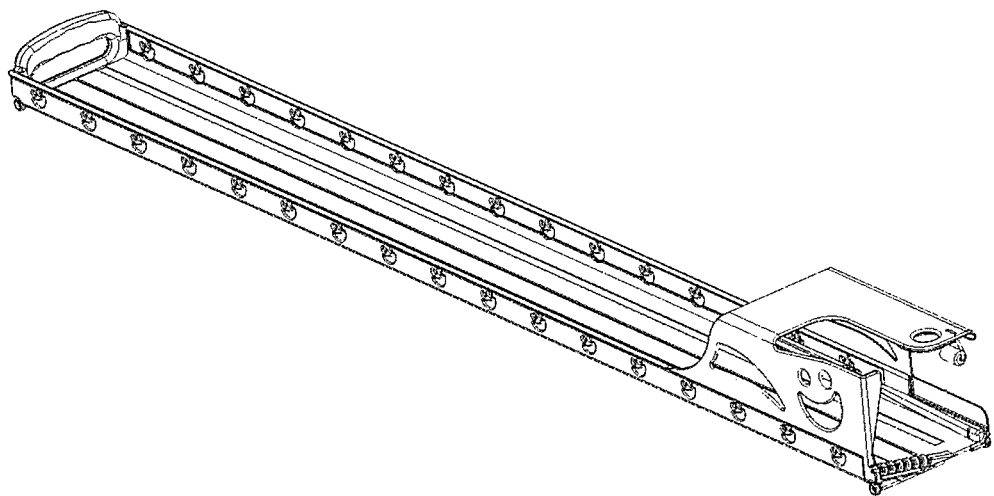
FIG. 1 is a structural diagram of a device in the prior art.

FIG. 1 shows a structural diagram of an existing drawer-type box-packed article distribution device, the existing drawer-type box-packed article distribution device is placed transversely, and a device similar to a spiral spring driving trolley or other devices have to be used for pushing box-packed articles behind.

First Embodiment

Figure 2:
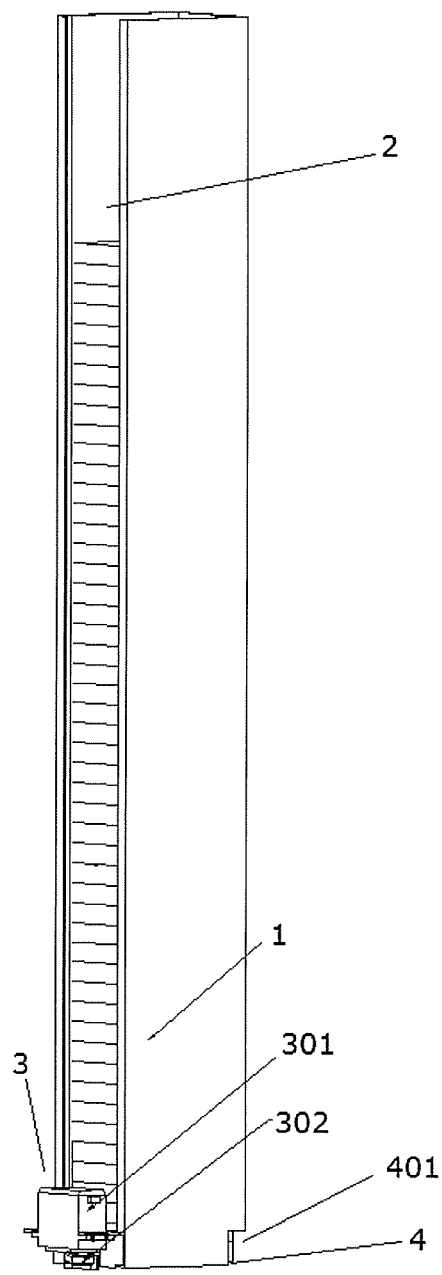
FIG. 2 is a structural diagram of a vertical storage and distribution device in the first embodiment of the invention under the condition that box-packed articles are stacked in the vertical storage and distribution device.
Figure 5:
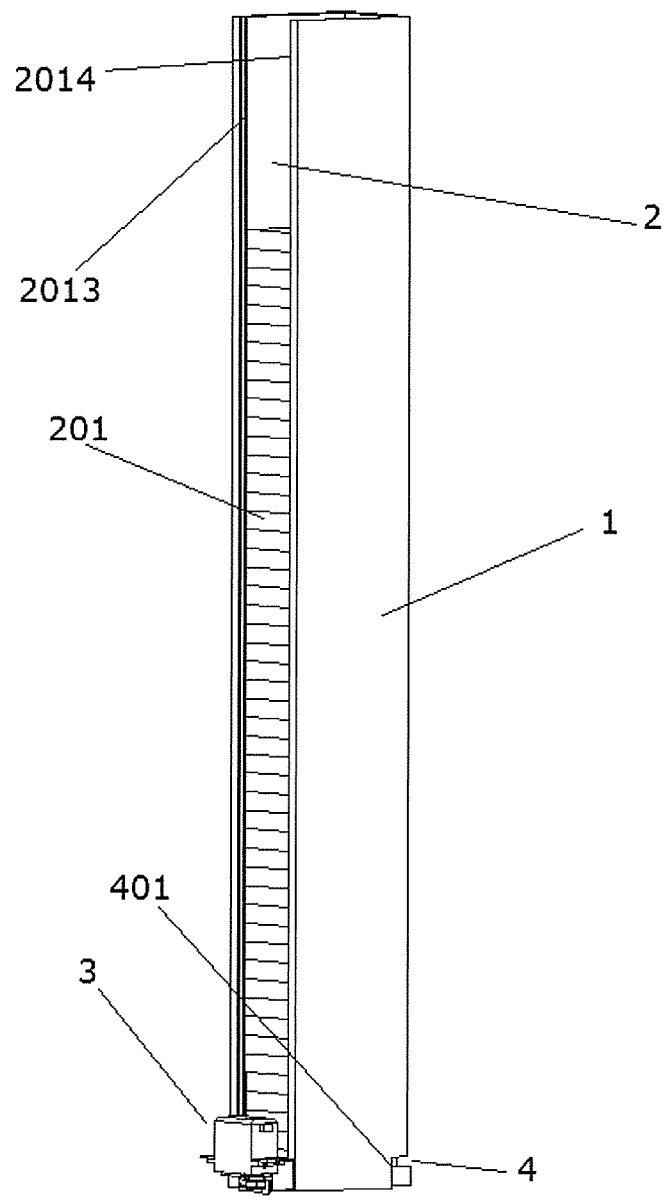
FIG. 5 is a structural diagram of FIG. 2 in the discharging process.
Figure 6:
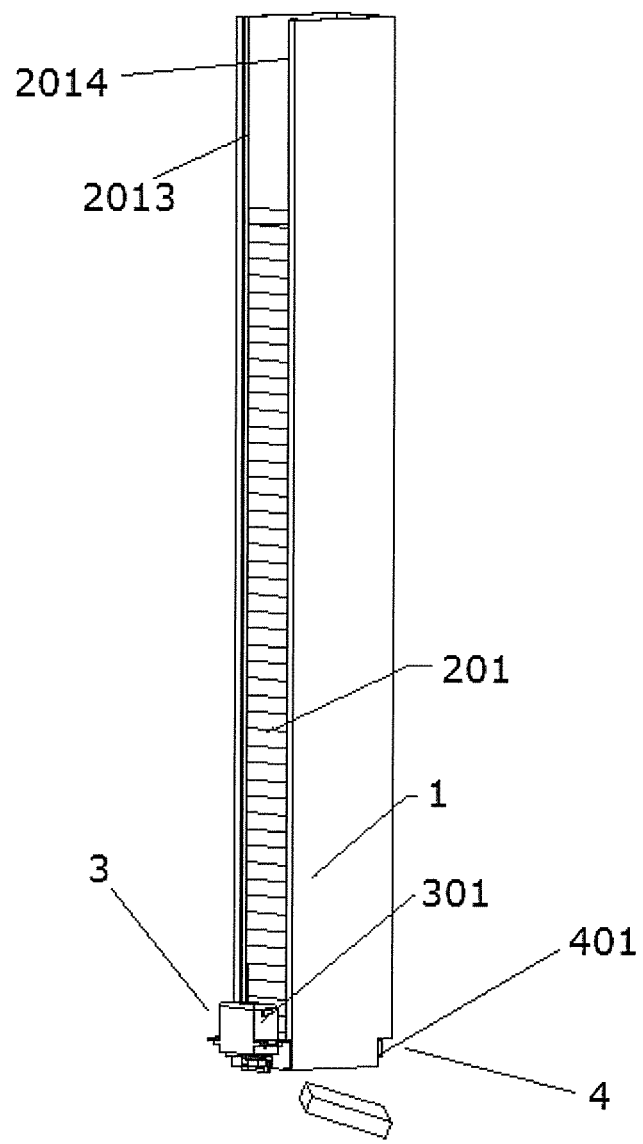
FIG. 6 is a structural diagram of an article which falls firstly in FIG. 5.
Figure 10:
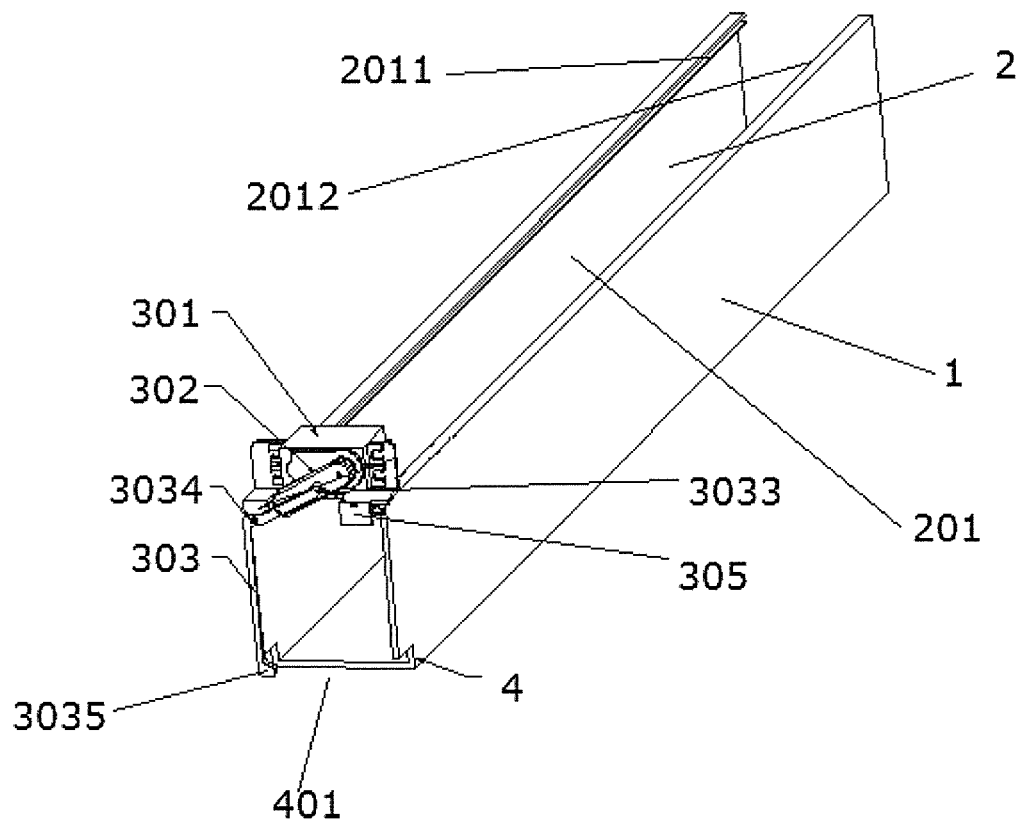
FIG. 10 is a structural diagram of the vertical storage and distribution device in the first embodiment of the invention.

As is shown in FIG. 10, a vertical article distribution device of the invention comprises a vertical storage channel 1 used for storing articles, and the vertical storage channel 1 is provided with a vertical storage trough 2; the articles can be sequentially stacked in the vertical storage trough 2 from bottom to top (as is shown in FIG. 2); a discharging mechanism 3 is arranged at the bottom end of the vertical storage trough 2 and located on the vertical storage channel 1; an outlet 4 is further formed in the bottom end of the vertical storage trough 2; the discharging mechanism 3 enables the article which is stacked at the lowermost position in the vertical storage trough 2 to move towards the outlet 4, as is shown in FIG. 5.

Figure 3:
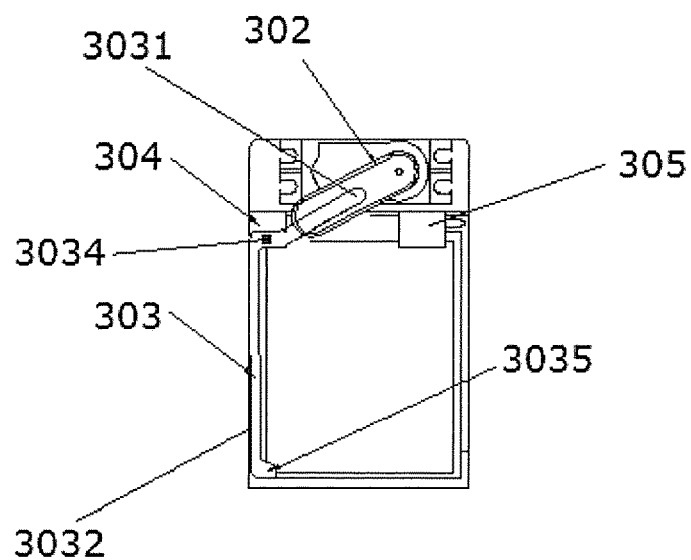
FIG. 3 is an enlarged structural diagram of a discharging mechanism in an article supporting state in FIG. 2.

As is shown in FIG. 3, the discharging mechanism 3 is provided with a push plate 302, and the push plate 302 can move towards the outlet 4, so that the articles are made to fall to be discharged; the discharging mechanism 3 is further provided with a shifting fork 303, one end 3031 of the shifting fork 303 is movably connected with the push plate 302, and the other end 3032 of the shifting fork 303 is close to and located at the lower end of the outlet 4 and forms a supporting point 3035 for supporting a to-be-discharged article; two baffles 304, 305 transversely extent out from the discharging mechanism 3; the push plate 302 is located between the two baffles 304, 305.

Figure 4:
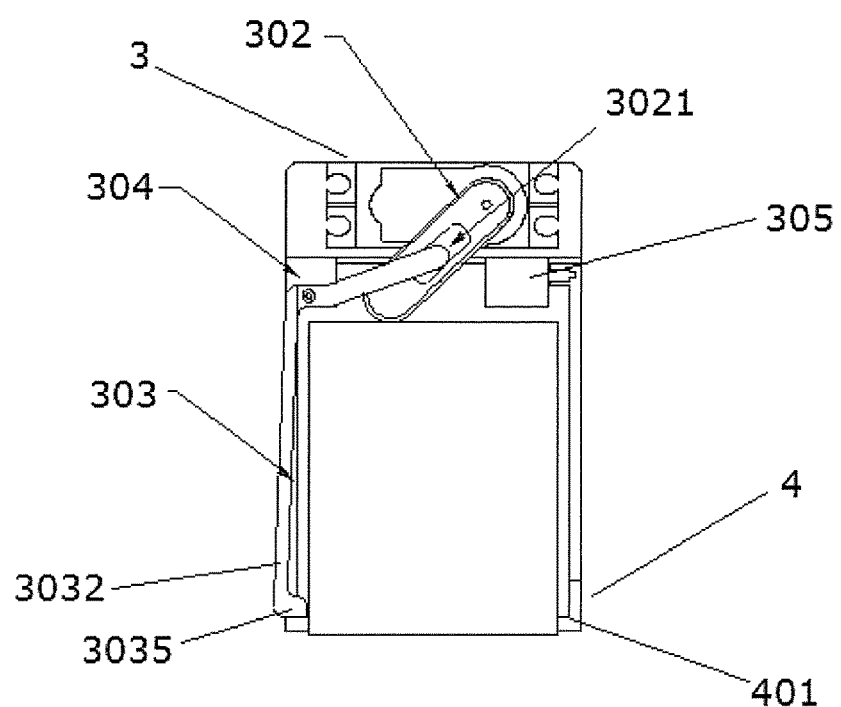
FIG. 4 is a structural diagram of the discharging mechanism in the article discharging state in FIG. 3.

In FIG. 4, a shifting fork wheel 3033 (the component can also be clearly seen in FIG. 10) is arranged at the end, movably connected with the push plate 302, of the shifting fork and located in a sliding groove 3021 of the push plate 302, and the shifting fork wheel 3033 can reciprocate in the sliding groove 3021 in the length direction; the shifting fork 303 is connected with each baffle 304 through a shifting fork rotating shaft 3034.

In the embodiment, as is shown in FIG. 10, a notch 401 is formed in the side, away from the push plate 302, of the outlet 4, and the other end 3032 of the shifting fork is located at the lower end of the notch 401.

The discharging mechanism 3 is provided with a motor 301, the push plate 302 is driven by the motor 301, and one end of the push plate 302 is connected with the motor 301 and can transversely move inwards and outwards around the connection point.

As is shown in FIG. 2, FIG. 5, FIG. 6 and FIG. 10, the discharging mechanism 3 can move up and down along one side of the vertical storage trough 2, specifically, in the embodiment, one side of the vertical storage trough 2 is open, so that a mounting surface 201 for the discharging mechanism is formed; grooves 2013, 2014 are formed in the two vertical edges 2011, 2012 of the mounting surface 201 respectively, the portions, connected with the vertical storage trough 2, of the discharging mechanism 3 are inlaid and mounted in the grooves 2013, 2014, and thus the discharging mechanism 3 can vertically move up and down on one side of the vertical storage trough along the grooves 2013, 2014.

Figure 7:
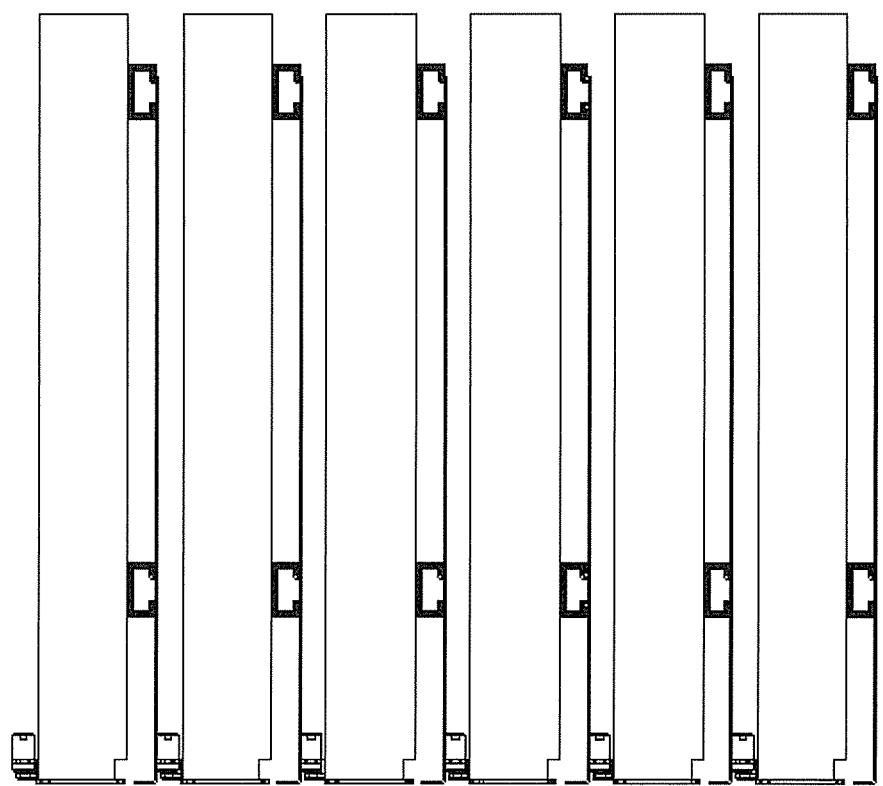
FIG. 7 is a structural diagram of a plurality of vertical storage and distribution devices which are arranged freely in the longitudinal direction in the first embodiment.
Figure 8:
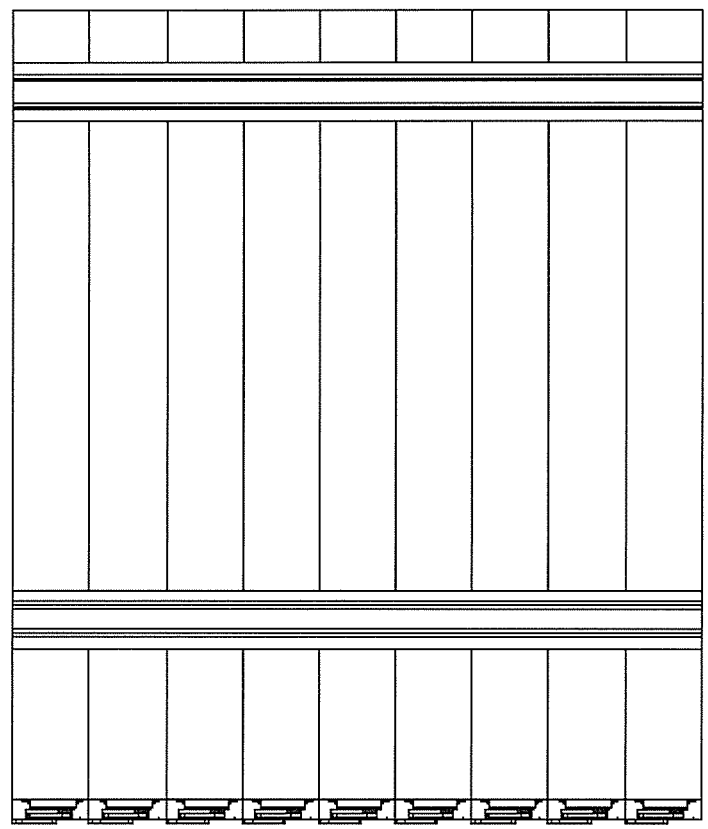
FIG. 8 is a structural diagram of a plurality of vertical storage and distribution devices which are arranged transversely in the first embodiment.
Figure 9:
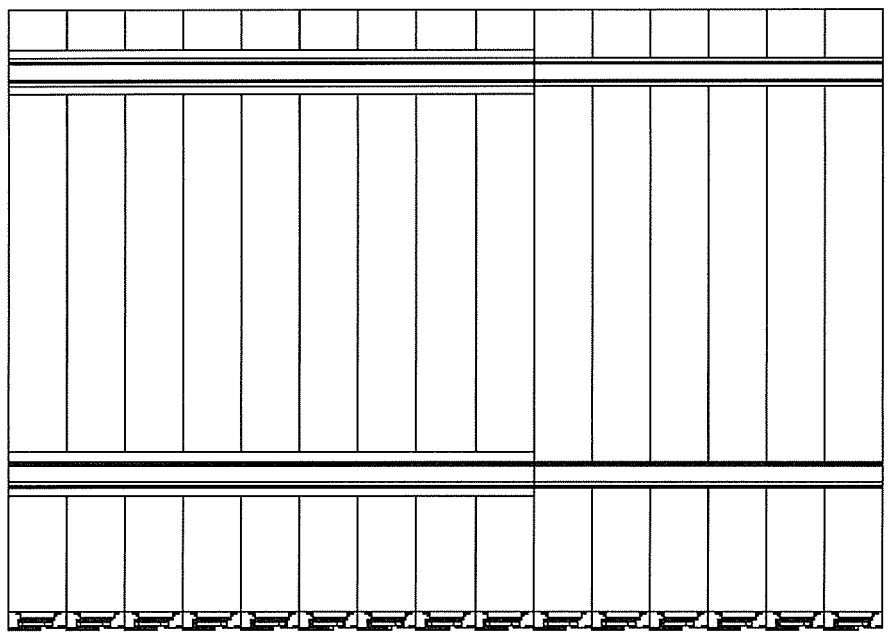
FIG. 9 is a structural diagram of FIG. 7 when vertical storage and distribution devices in any row are drawn out.

Multiple vertical article distribution devices in the embodiment can be arranged and assembled in the modes shown in FIG. 7, FIG. 8 and FIG. 9 so as to form a drug storage rack.

In specific use of the vertical article distribution device in the embodiment: box-packed drugs are stacked in the vertical storage trough, specifically, the discharging mechanism 3 moves upwards along the side, with the mounting surface, of the vertical storage trough 2, the box-packed drugs are added into the vertical storage trough 2 in a stacked mode from a drug adding port in the upper end of the vertical storage channel 1 based on the maximum lateral areas, the discharging mechanism 3 moves downwards gradually along the side, with the mounting surface 201, of the vertical storage trough 2 along with continuous adding of the box-packed drugs and continuously moves to the bottom end of the vertical storage trough 2, at the moment, the supporting point 3035 of the shifting fork 303 and the two baffles 304, 305 on the discharging mechanism 3 form three supporting points for the stacked box-packed drugs;

when the control system sends out an instruction for drug distribution, the motor 301 drives the push plate 302 located between the two baffles 304, 305, the push plate 302 moves inwards to push the box-packed drug at the lowermost position to move towards the outlet 4, the supporting point 3035 of the shifting fork 303 is driven to move outwards while the push plate 302 moves inwards, at the moment, the box-packed drug at the lowermost position is not supported anymore and falls down with the maximum lateral area from the notch 401 of the outlet 4 based on gravity, and the falling point is stable.

The vertical article distribution device of the structure of the invention is simple in structure and convenient to operate, box-packed articles can be discharged out of warehouse smoothly, and the working efficiency is improved.

Second Embodiment

Figure 11:
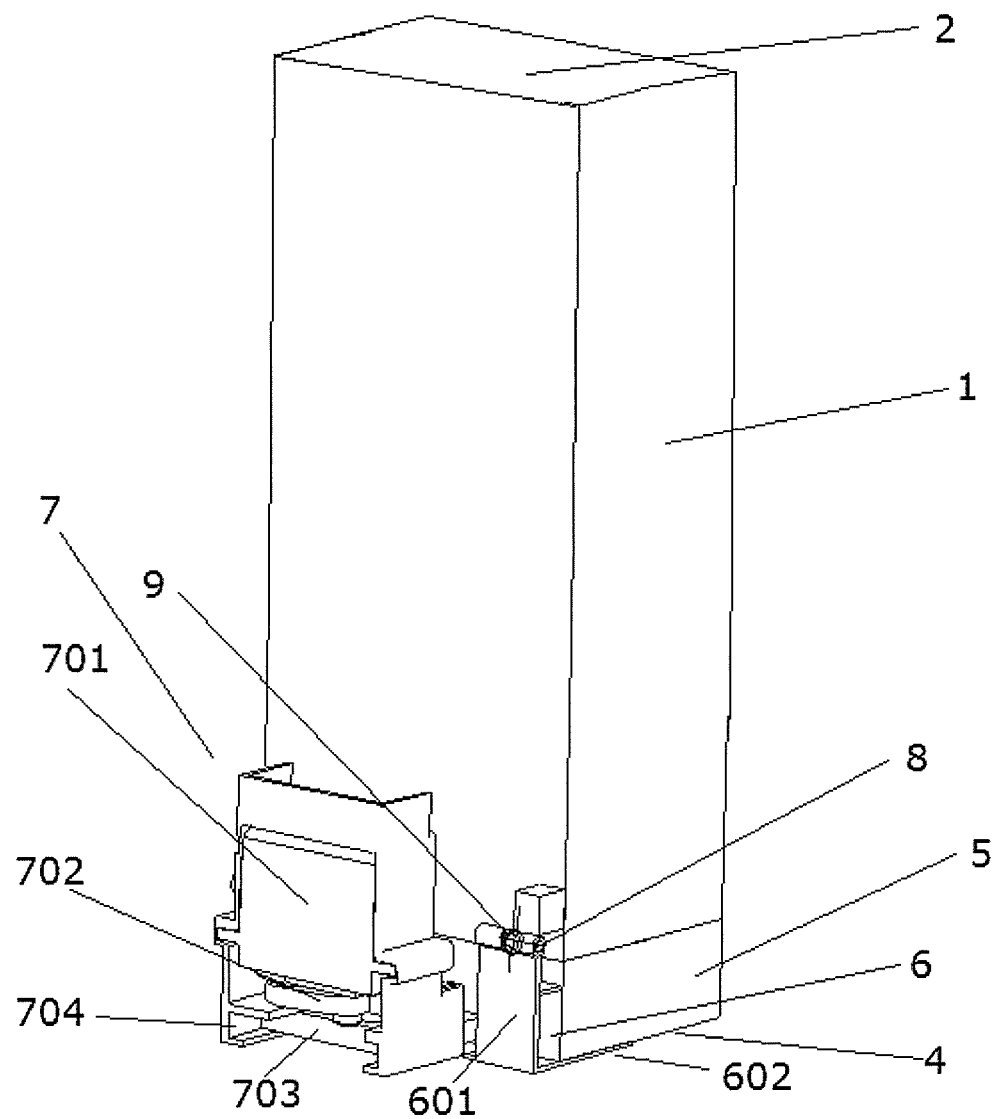
FIG. 11 is a structural diagram of a vertical storage and distribution device in a second embodiment of the invention.

In the embodiment, as is shown in FIG. 11, the vertical storage and distribution device comprises a vertical storage channel 1 used for storing articles, and the vertical storage channel 1 is provided with a vertical storage trough 2 composed of at least two side plates; the articles can be sequentially stacked in the vertical storage trough 2 from bottom to top; an outlet is formed in the bottom end of the vertical storage trough 2, and the articles which are sequentially stacked in the vertical storage trough 2 can be sequentially distributed from the outlet 4 from bottom to top.

As is shown in FIG. 11, a discharging mechanism 7 is arranged on the vertical storage channel 1; the discharging mechanism 7 acts to enable the articles which are sequentially stacked in the vertical storage trough 2 to be sequentially distributed from the outlet 4 from bottom to top; as is shown in FIGS. 11-13, 21 and 22A-22D, a discharging module 5 which can contain at least one article is arranged at the lower end of the vertical storage trough 2 (in the embodiment, the discharging module 5 can contain one article 11), and the discharging module 5 can move to be dislocated relative to the vertical storage trough 2; movable turning plates 6 is arranged at the bottom of the discharging module 5, the discharging mechanism 7 comprises a motor 701, and the motor 701 drives a crank 702 to rotate so as to make the push plate 703 reciprocate in a slideway 704; the discharging module 5 is pushed by the push plate 703 to be dislocated; the movable turning plates 6 make contact with the discharging module 5 when articles are distributed.

Figure 12:
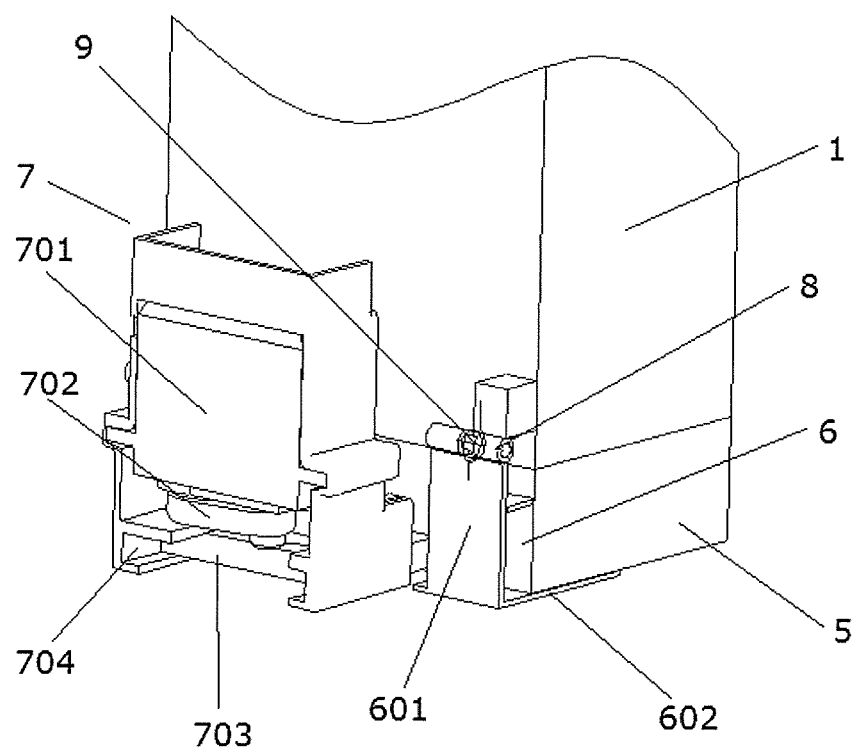
FIG. 12 is a local enlarged structural diagram of the lower end of FIG. 11.
Figure 13:
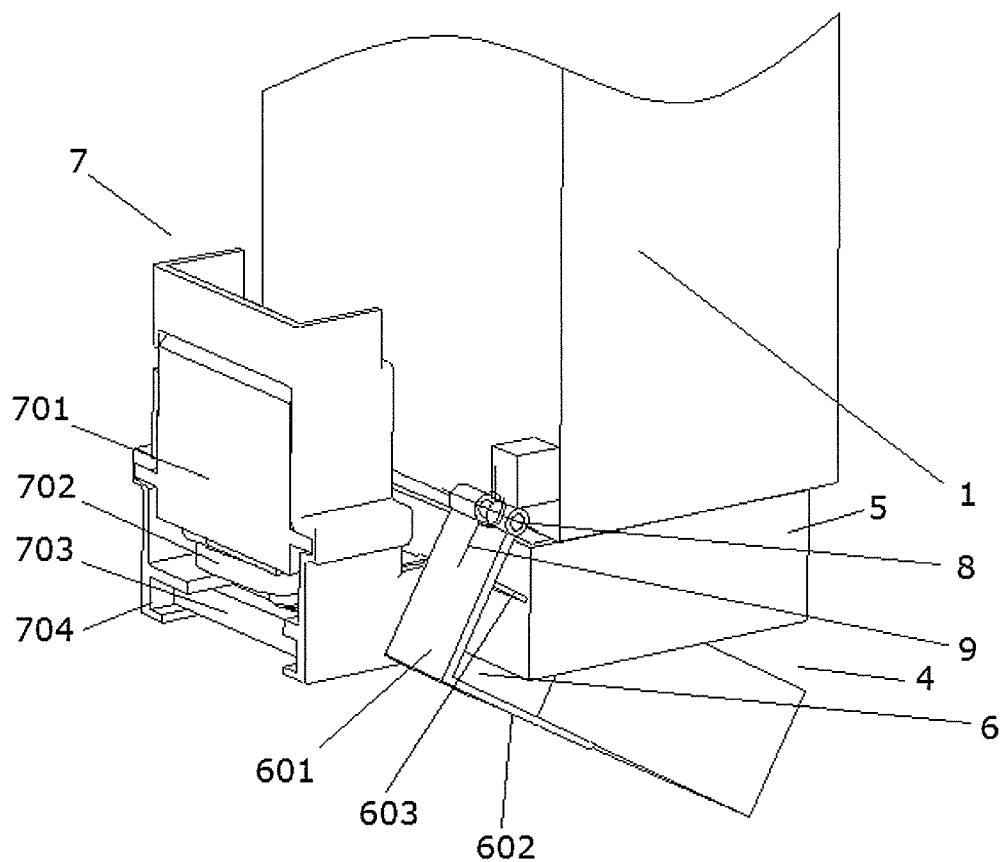
FIG. 13 is a structural diagram of the vertical storage and distribution device when articles are distributed in FIG. 12.
Figure 14:
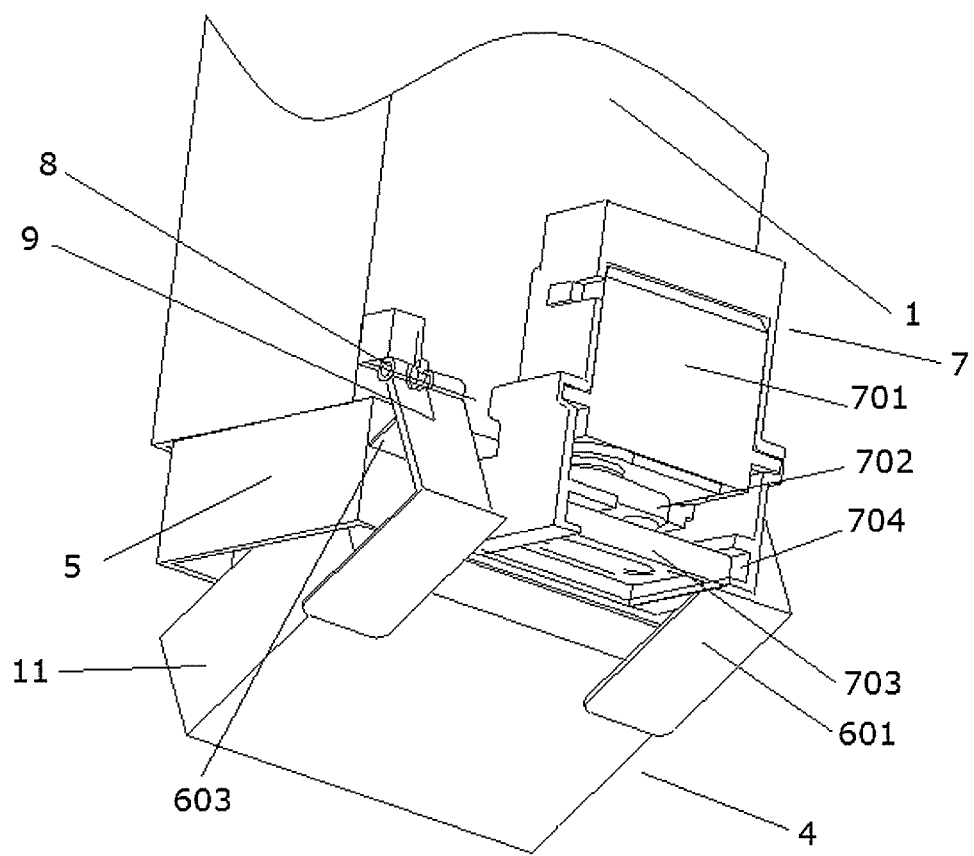
FIG. 14 is a structural diagram of the vertical storage and distribution device when articles are distributed in FIG. 12.

As is shown in FIG. 12, each movable turning plate 6 comprises a vertical plate 601 and a horizontal plate 602, wherein the vertical plate 601 is connected with the vertical storage channel 1 through a hinge 8 and can rotate around the hinge 8 at a certain angle to make the horizontal plate 602 incline, and the article 11 located in the discharging module 5 is separated from the horizontal plate 602 and then is distributed, as is shown in FIG. 13 and FIG. 14.

In the embodiment, the movable turning plates 6 are arranged on both sides of the discharging mechanism 7, and thus the articles can be distributed stably; as is shown in FIGS. 11-14, torsion springs 9 are mounted on the hinges 8, and the discharging module 5 is provided with a detection component.

Figure 15:
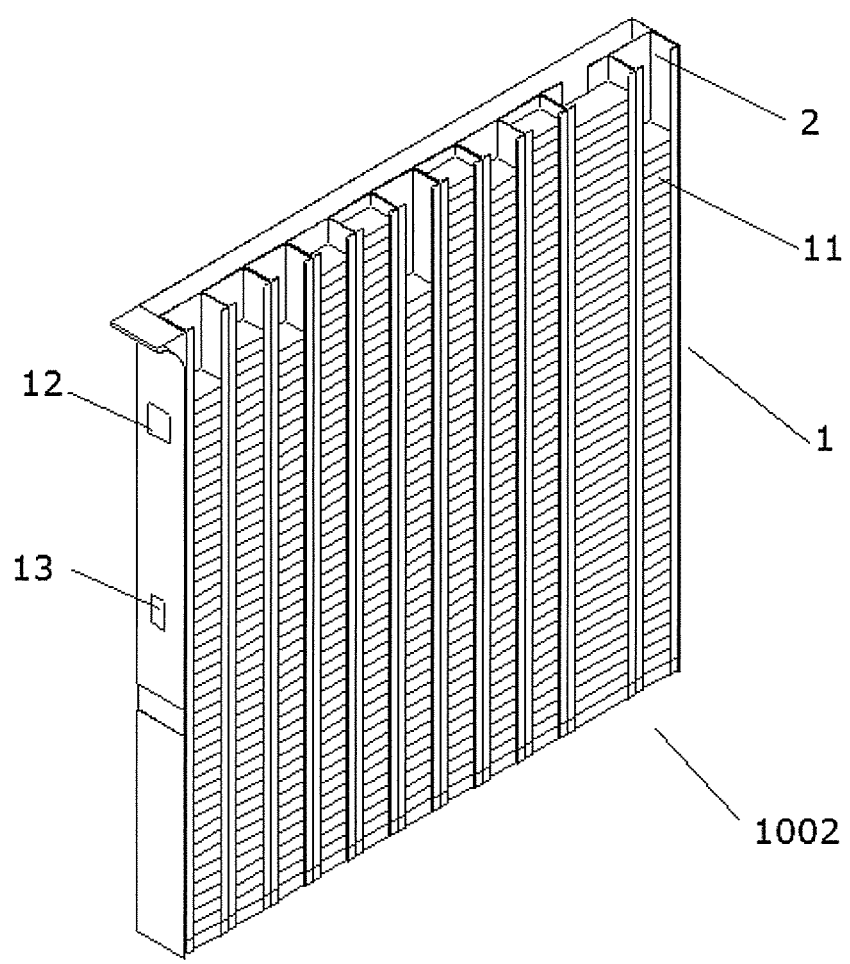
FIG. 15 is a structural diagram of a drug storage trough unit, of a drawer-type structure, formed by combining a plurality of vertical storage and distribution devices in FIG. 11.
Figure 16:
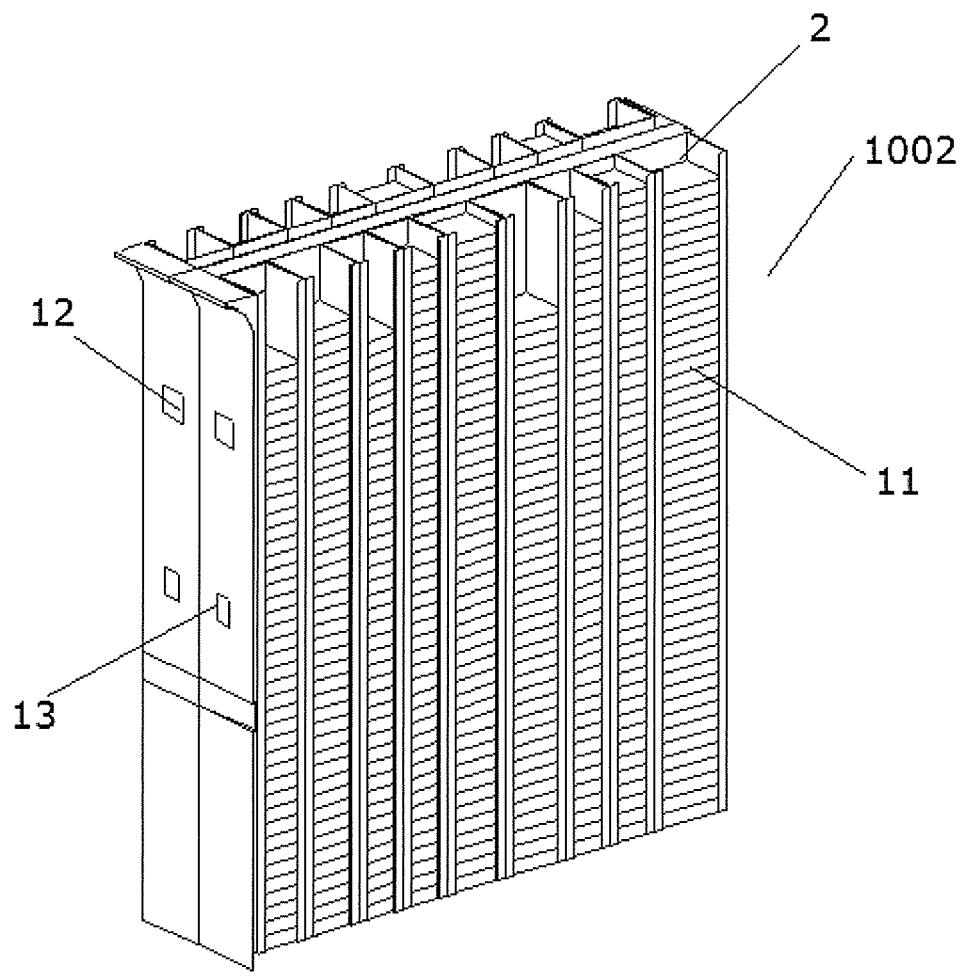
FIG. 16 is a structural diagram of a drug storage trough unit, of a drawer-type structure, formed by combining a plurality of vertical storage and distribution device in FIG. 11.
Figure 17:
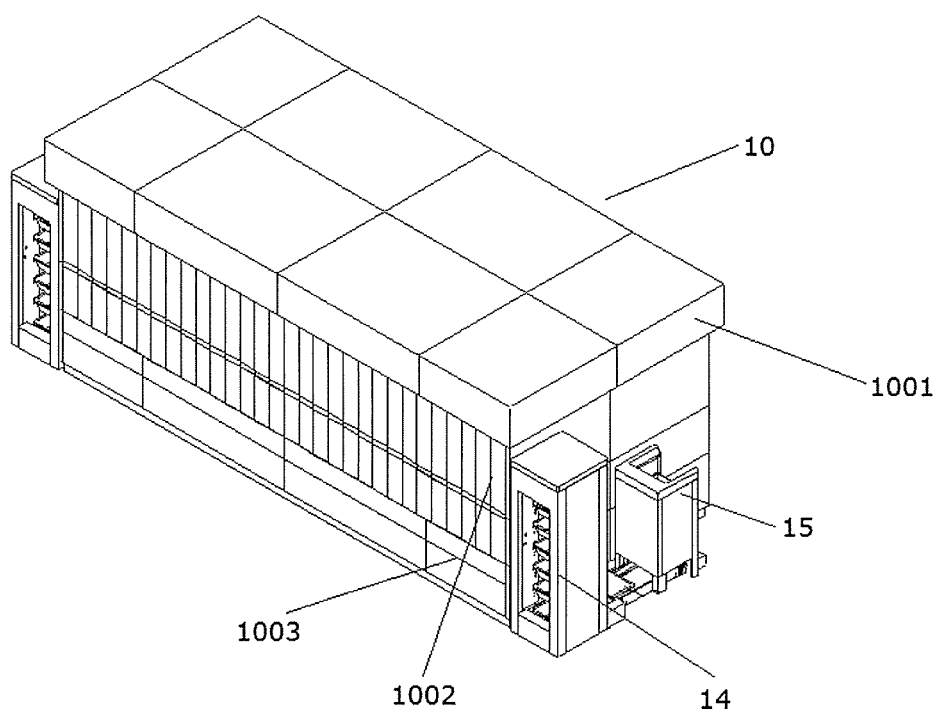
FIG. 17 is a structural diagram of a vertical storage and distribution type drug dispenser in the second embodiment.
Figure 18:
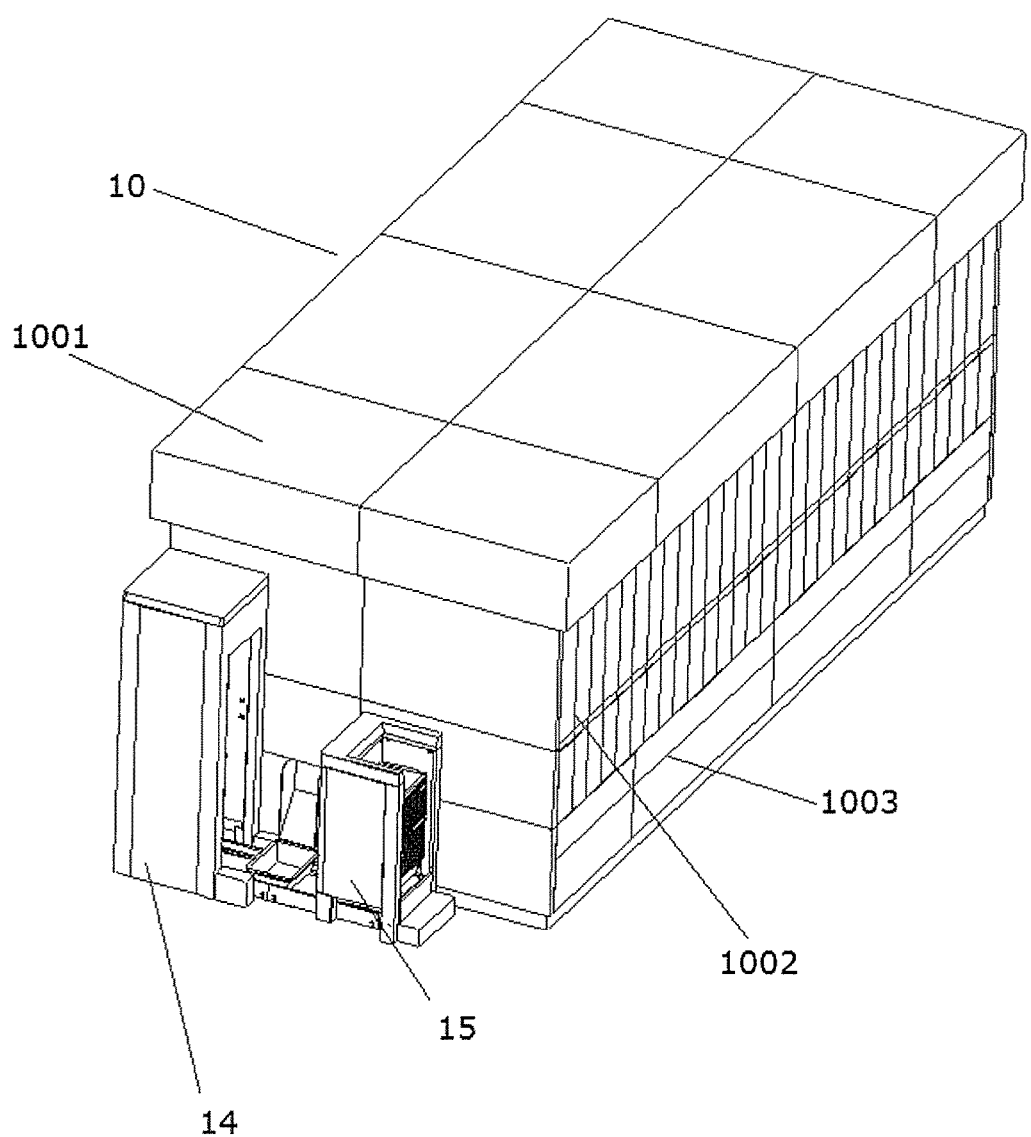
FIG. 18 is a right side view of FIG. 17.
Figure 19:
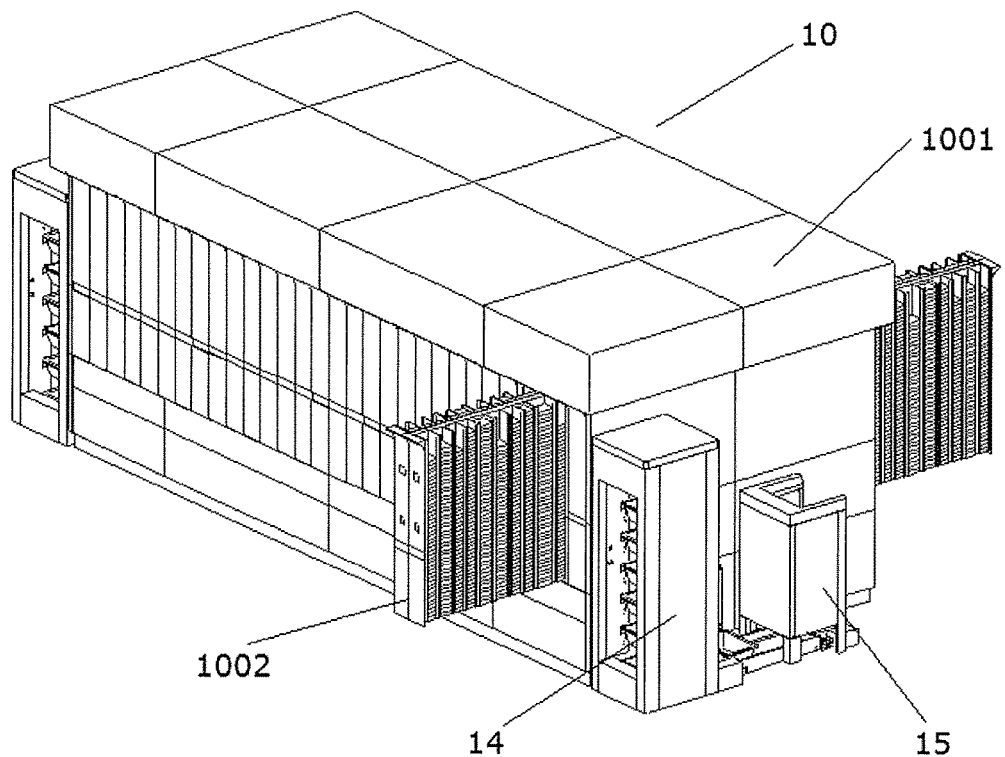
FIG. 19 is a structural diagram of part of the drug storage trough units of the drawer-type structure in FIG. 17.

As is shown in FIG. 17 and FIG. 18, a vertical storage and distribution type drug dispenser in the embodiment adopts the vertical storage and distribution devices (as is shown in FIG. 19) and comprises a control system and a frame 1001, wherein at least one drug storage trough unit 1002 is arranged in the frame 1001, each drug storage trough unit 1002 is formed by combining a plurality of vertical storage and distribution devices (as is shown in FIG. 15 and FIG. 16), a conveying device 1003 is located at the lower ends of the drug storage trough units 1002, drugs conveyed out by the conveying device 1003 are placed in baskets distributed through a basket dispenser 15 and then distributed to positions in an area designated by another control system through a basket elevator 14; what needs to be particularly pointed out is that as is shown in FIG. 15 and FIG. 16, each drug storage trough unit 1002 is of a drawer-type structure, an LED display 12 and a handle 13 are arranged on each drug storage trough unit 1002, and the LED displays 12 are used for indicating whether drugs need to be added into the drug storage trough units 1002 or not; particularly, a plurality of vertical storage and distribution devices are arranged on the two sides of the drug storage trough units 1002 of the drawer-type structure in FIG. 16.

In the embodiment, the conveying device 1003 comprises a sorting conveying part and a directional conveying part, and for the view reason, the sorting conveying part and the directional conveying part are not shown in the FIGs.

Figure 20:
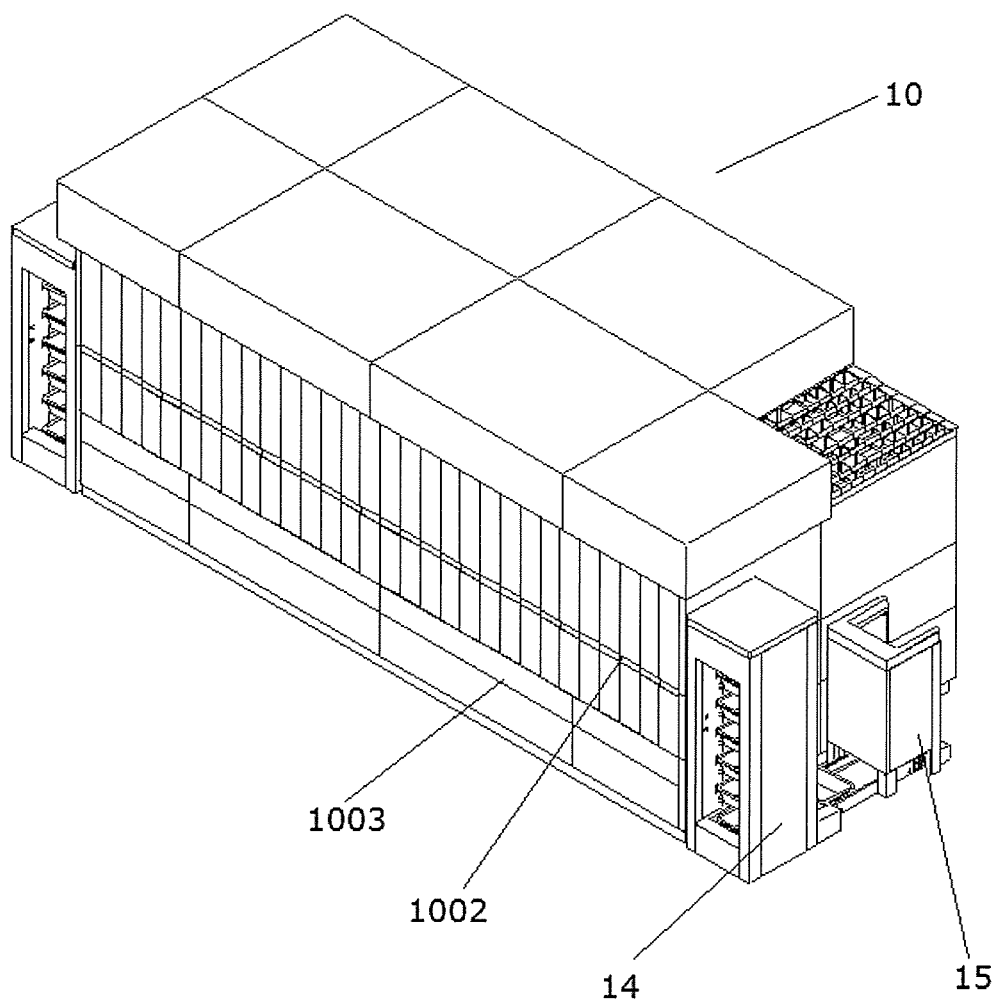
FIG. 20 is a local sectional structural diagram of the bottom of the vertical storage and distribution type drug dispenser in FIG. 17.
Figure 21:
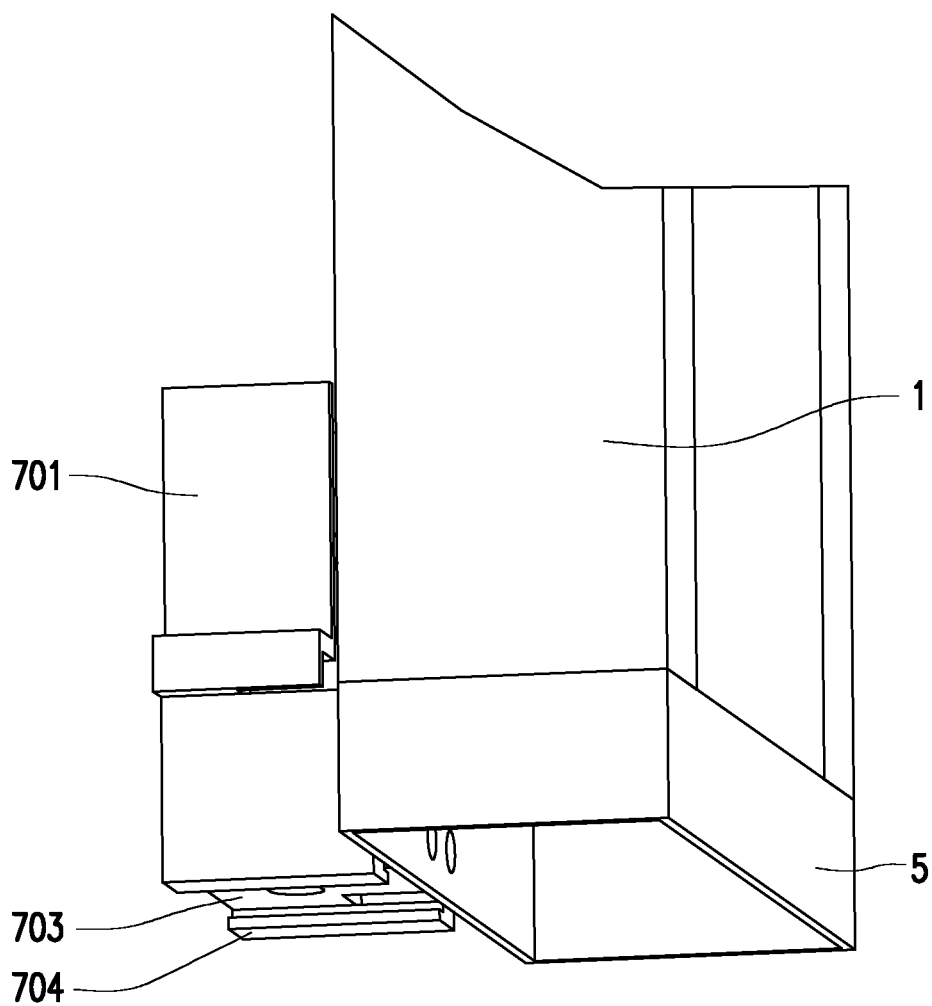
FIG. 21 is a local enlarged structural diagram of the vertical storage and distribution device in the second embodiment of the invention.
Figure 22A:
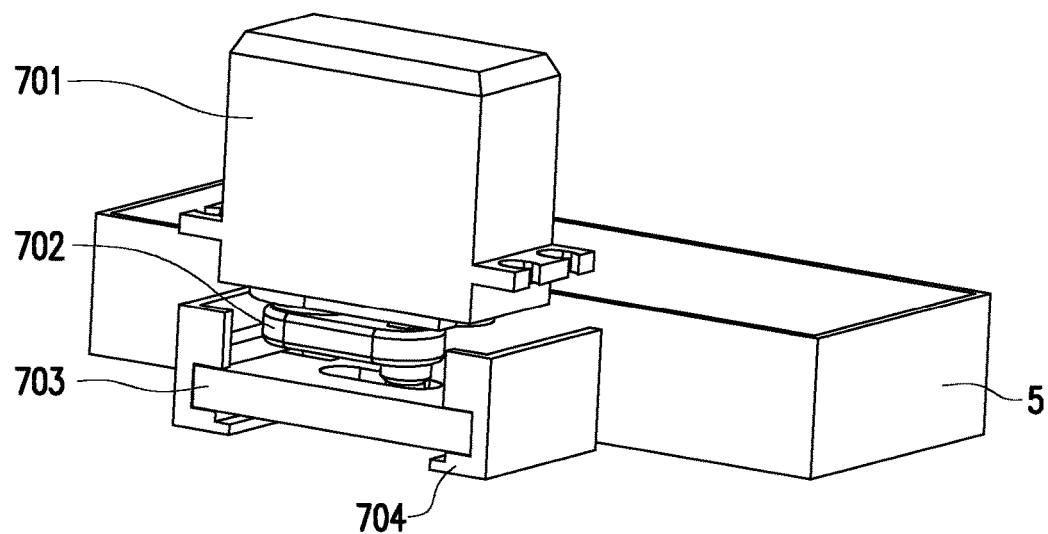
FIGS. 22A to 22D are structural diagrams of the discharging module, the crank, the push plate and the slideway, respectively.
Figure 22B:
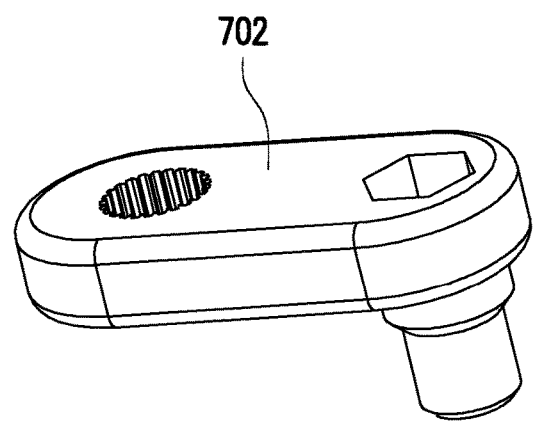
Figure 22C:
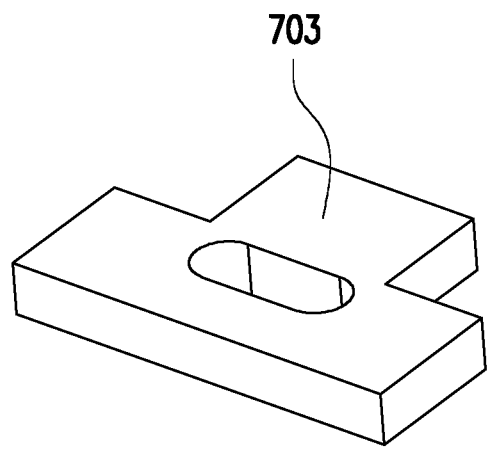
Figure 22D:
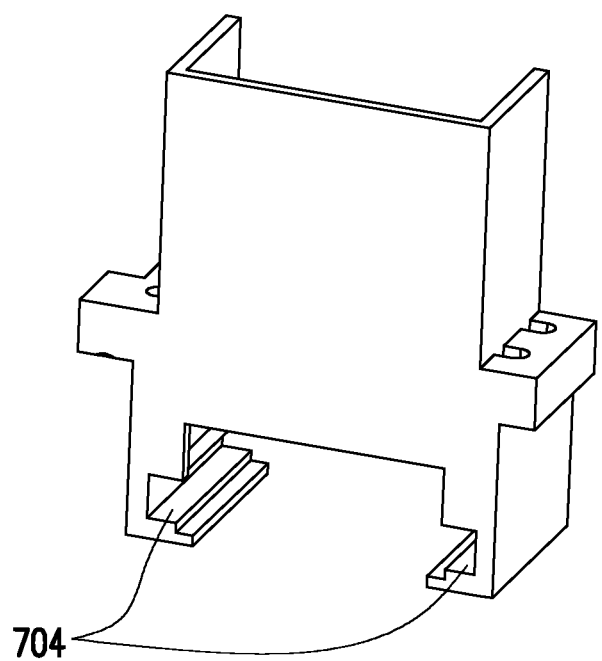

As is shown in FIG. 20, the multiple vertical storage and distribution devices located in the frame 1001 are assembled and arranged in a honeycomb mesh shape on the cross section of the frame 1001.

When the vertical storage and distribution type drug dispenser in the embodiment specifically operates in use, the control system sends out a drug adding instruction, drugs can be placed into the vertical storage trough 2 in each vertical storage and distribution device in each storage trough unit 1002 in a stacked mode from bottom to top through a manipulator drug feeding device (used for adding drugs) located at the upper end of the frame (of course, drugs can also be added manually by pulling out each drug storage trough unit 1002, as is shown in FIG. 19), at the moment, the discharging mechanism 7 is located at the original position, the movable turning plates 6 are also located at the original positions, and the article 11 in the discharging module 5 is supported by the horizontal plates 602;

when the control system sends out an instruction for drug distribution, the discharging mechanism 7 in the vertical storage and distribution device starts to act, and the motor 701 drives the crank 702 to rotate to make the push plate 703 reciprocate in the slideway 704; the discharging module 5 is pushed by the push plate 703 to move to be dislocated, as is shown in FIG. 13 and FIG. 14, at the moment, the drug which is located over the discharging module and in the vertical storage trough 2 is supported by the upper end border of the discharging module 5 and cannot fall, and the article 11 in the discharging module 5 can be distributed without being affected; during drug distribution, the vertical plates 602 of the movable turning plates 6 are pushed by the discharging module 5 and thus make contact with the discharging module (as is shown in FIG. 13 and FIG. 14, a transverse push plate 603 on the vertical plates 601 make contacts with the discharging module 5); since the vertical plates 601 are pushed by thrust of the discharging module 5, the horizontal plates 602 used for supporting the article 11 (the drug) starts to incline, and the article 11 (the drug) is not supported anymore and slides away from the discharging module 5 along the oblique horizontal plates 602, and thus the article is distributed;

after the drug is distributed, the motor 701 drives the crank 702 to rotate to make the push plate 703 return to the original position in the slideway 704, the movable turning plates 6 also return to the original positions under the effect of the torsion springs 9 on the hinges 8, the discharging module 5 is pushed to return to the original position accordingly, the vertical storage trough 2 falls into the discharging module 5, and another drug is supported by the horizontal plates 602 again; in the embodiment, the two movable turning plates 6 are adopted, so that the beneficial effects of more stable supporting and faster returning of the discharging module 5 are achieved.

When the detection component in the discharging module 5 detects a drug, the control system can instantly send a drug distribution instruction to the vertical storage and distribution type drug dispenser, the distribution process is performed repeatedly, and the drug distribution speed is high.

The articles are distributed and falls onto the sorting conveying part of the conveying device 1003 and then are conveyed to the directional conveying part, the directional conveying part conveys the distributed drugs to an outlet of the drug dispenser, the drugs enter baskets located on a basket conveying belt, and all the baskets are conveyed to a basket elevator 14 from a basket dispenser 15 through the basket conveying belt and then are distributed to positions in an area designated by another control system through the basket elevator 14.

The vertical storage and distribution type drug dispenser of the structure in the embodiment is simple in structure and convenient to operate, box-packed products can be discharged out of a warehouse conveniently, and the working efficiency is improved.

A detailed description of the embodiments of the invention is given above with the accompanying drawings, however, the invention is not limited to the above embodiments, for example, within the knowledge range of those skilled in the field, various changes of the storage channel can be made without deviating from the intention of the invention.

What is claimed is:

1. A vertical storage and distribution device, comprising a vertical storage channel used for storing articles, wherein the vertical storage channel is provided with a vertical storage trough composed of at least two side plates; the articles are sequentially stacked in the vertical storage trough from bottom to top; an outlet is formed in a bottom end of the vertical storage trough, and the articles which are sequentially stacked in the vertical storage trough can be sequentially distributed from the outlet from bottom to top,
   wherein a discharging mechanism is arranged on the vertical storage channel, and the discharging mechanism acts to enable the articles which are sequentially stacked in the vertical storage trough be sequentially distributed from the outlet from bottom to top,
   wherein a discharging module which contains at least one of the articles is arranged at a lower end of the vertical storage trough, and the discharging module moves to be dislocated relative to the vertical storage trough; movable turning plates are arranged at a bottom of the discharging module,
   wherein the discharging mechanism comprises a motor, the motor drives a crank to rotate so as to make a push plate reciprocate in a slideway, the push plate pushes the discharging module to move to be dislocated, and the movable turning plates make contact with the discharging module when the articles are distributed,
   wherein each of the movable turning plates comprises a vertical plate and a horizontal plate, wherein the vertical plate is connected with the vertical storage channel through a hinge and can rotate around the hinge at a certain angle to make the horizontal plate incline, and the at least one of the articles located in the discharging module is separated from the horizontal plate to be distributed,
   wherein torsion springs are arranged on the hinges, and the discharging module is provided with a detection component,
   wherein the vertical plate is integrally connected to the horizontal plate.

* * * * *